(12) United States Patent
Takeuchi

(10) Patent No.: US 6,313,945 B1
(45) Date of Patent: Nov. 6, 2001

(54) STAGE APPARATUS OF A MICROSCOPE

(75) Inventor: Atsushi Takeuchi, Yokohama (JP)

(73) Assignee: Nikon Corporation, Tokyo (JP)

( * ) Notice: Subject to any disclaimer, the term of this patent is extended or adjusted under 35 U.S.C. 154(b) by 0 days.

(21) Appl. No.: 09/572,100

(22) Filed: May 17, 2000

(30) Foreign Application Priority Data

May 19, 1999 (JP) .................................................. 11-138084

(51) Int. Cl.[7] ............................ G02B 21/26; G02B 21/00
(52) U.S. Cl. .......................... 359/393; 359/368; 359/391
(58) Field of Search ............................ 359/368, 391–395; 74/89.22, 490.09, 490.13

(56) References Cited

U.S. PATENT DOCUMENTS

| | | | | |
|---|---|---|---|---|
| 4,711,537 | * | 12/1987 | Schindl et al. | ........................ 359/393 |
| 4,766,465 | * | 8/1988 | Takahashi | ............................ 359/393 |
| 6,049,420 | * | 4/2000 | Kraft | ..................... 359/393 |

* cited by examiner

Primary Examiner—Thong Nguyen
(74) Attorney, Agent, or Firm—Morgan, Lewis & Bockius LLP

(57) ABSTRACT

A stage apparatus of a microscope comprises a base element fixed to a main body of a microscope, a first moving element movable in a first direction relative to the base element, a second moving element movable in a second direction perpendicular to the first direction relative to the first moving, element, a first rotary operation disposed on the base element for moving the first moving element, a second rotary operation disposed on the base element for moving the second moving element, a first drive disposed between the first operating and the first moving element for transmitting the rotational force of the first operation to the first moving element. A rotary shaft disposed on the base element, extend along the first direction and rotates in response to the rotary operation of the second rotary operation. A transmitting disposed coaxially with the rotary shaft, is movable in the direction of the axis of the rotary shaft, and is rotatable integrally with the rotary shaft. A second drive disposed between the transmitting and the second moving element for transmitting the rotational force of the second operation to the second moving element.

6 Claims, 5 Drawing Sheets

STAGE APPARATUS OF A MICROSCOPE

This application claims the benefit of Japanese Patent application No. 11-138084 which is hereby incorporated by reference.

BACKGROUND OF THE INVENTION

1. Field of the Invention

The present invention relates to a stage apparatus and, in particular, to a stage apparatus movable in XY directions.

2. Related Background Art

Conventionally, a stage apparatus is used, for example, in a microscope. The stage includes a base plate fixed on the microscope, an intermediate plate movable in the Y direction (in the back and forth directions relative to the microscope) relative to the base plate, and an upper plate on which a specimen is to be placed movable in the X direction perpendicular to the Y axis (in the right and left directions relative to the microscope). The upper plate is provided so that it is movable not only in the X direction but also in the Y direction integrally with the intermediate plate.

The intermediate plate is provided with a single-axis handle, and the stage can be independently moved in the X and Y directions.

A stage apparatus in which an operation handle for moving a stage in the X and Y directions is disposed on a base plate is also known(gee Japanese Unexamined Patent Publication Hei 9-127427).

In this stage, an intermediate plate (a plate moving in the Y direction) is moved by a rack and pinion, and an upper plate (a plate moving in the X direction) is moved in the Y direction integrally with the intermediate plate. A drive mechanism disposed between the operation handle and the upper plate for moving the upper plate includes two levers and a joining point and can follow the movement in the Y direction of the upper plate.

However, in the former case, when an observer moves the upper plate on which a specimen is placed in the Y direction, the observer has to move his or her hand with the single-axis handle because the single-axis handle also moves in the Y direction.

Meanwhile, an observer usually moves the stage while observing (observing through an eyepiece lens).

Accordingly, once the observer moves his or her hand off the handle, the observer has to grope for the handle, and when the handle is not stationary as described above, it is difficult to find the handle, and the operability of the stage is poor. In particular, when a wafer, a reticle, a liquid crystal substrate, etc. are to be observed, the stage should be large-sized, and thus the handle moves a longer distance and is more difficult to find.

Thus, the operability of the conventional stage apparatus used in a microscope is extremely poor, and, for an observer who uses the microscope for many hours, the operation of the stage has been very fatiguing work.

In the latter case, because the handle is stationary, the stage is easy to handle; however, the stage is structurally complicated, is hard to be manufactured with a high degree of precision (for example, to decrease backlash) and requires a large space to be incorporated.

SUMMARY OF THE INVENTION

The present invention has been made in view of such circumstances, and its object is to provide a stage apparatus easy to handle and simple in structure.

The stage apparatus of the present invention to solve the above problems is characterized in that it comprises a base element to be fixed to a main body of a microscope; a first moving element movable in a first direction relative to the base element; a second moving element movable in a second direction perpendicular to the first direction relative to the first moving element; a first rotary operation means disposed on said base element for moving said first moving element; a second rotary operation means disposed on said base element for moving said second moving element; a first drive means disposed between said first operation means and said first moving element for transmitting the rotational force of said first operation means to said first moving element; a rotary shaft that is disposed on said base element, extends along said first direction, and rotates in response to the rotary operation of said second rotary operation means; a transmitting means that is disposed coaxially with said rotary shaft, is movable in the direction of the axis of said rotary shaft, and is rotatable integrally with said rotary shaft; and a second drive means disposed between said transmitting means and said second moving element for transmitting the rotational force of said second operation means to said second moving element.

When the first rotary operation means is rotated, the rotational force is transmitted to the first moving element via the first drive means, and the first moving element moves in the first direction. When the second rotary operation means is rotated, the rotational force is transmitted to the second moving element via the rotary shaft, the transmitting means, and the second drive means, and the second moving element moves in the second direction perpendicular to the first direction. The transmitting means moves in the first direction integrally with the first moving element and the second moving element. On this occasion, because the first rotary operation means and the second rotary operation means are disposed on the base plate, they do not move even when the first moving element and the second moving element are moved. Further, the stage is structurally simple as compared with conventional examples.

In the stage apparatus, said second rotary operation means and said first rotary operation means may be disposed on said rotary shaft extending along said first direction and on an operation shaft perpendicular to said rotary shaft, respectively. Because the second rotary operation means is disposed on the rotary shaft, the number of components can be reduced.

DESCRIPTION OF THE PREFERRED EMBODIMENTS

Embodiments of the present invention will hereinafter be described with reference to the drawings.

Figure 1:
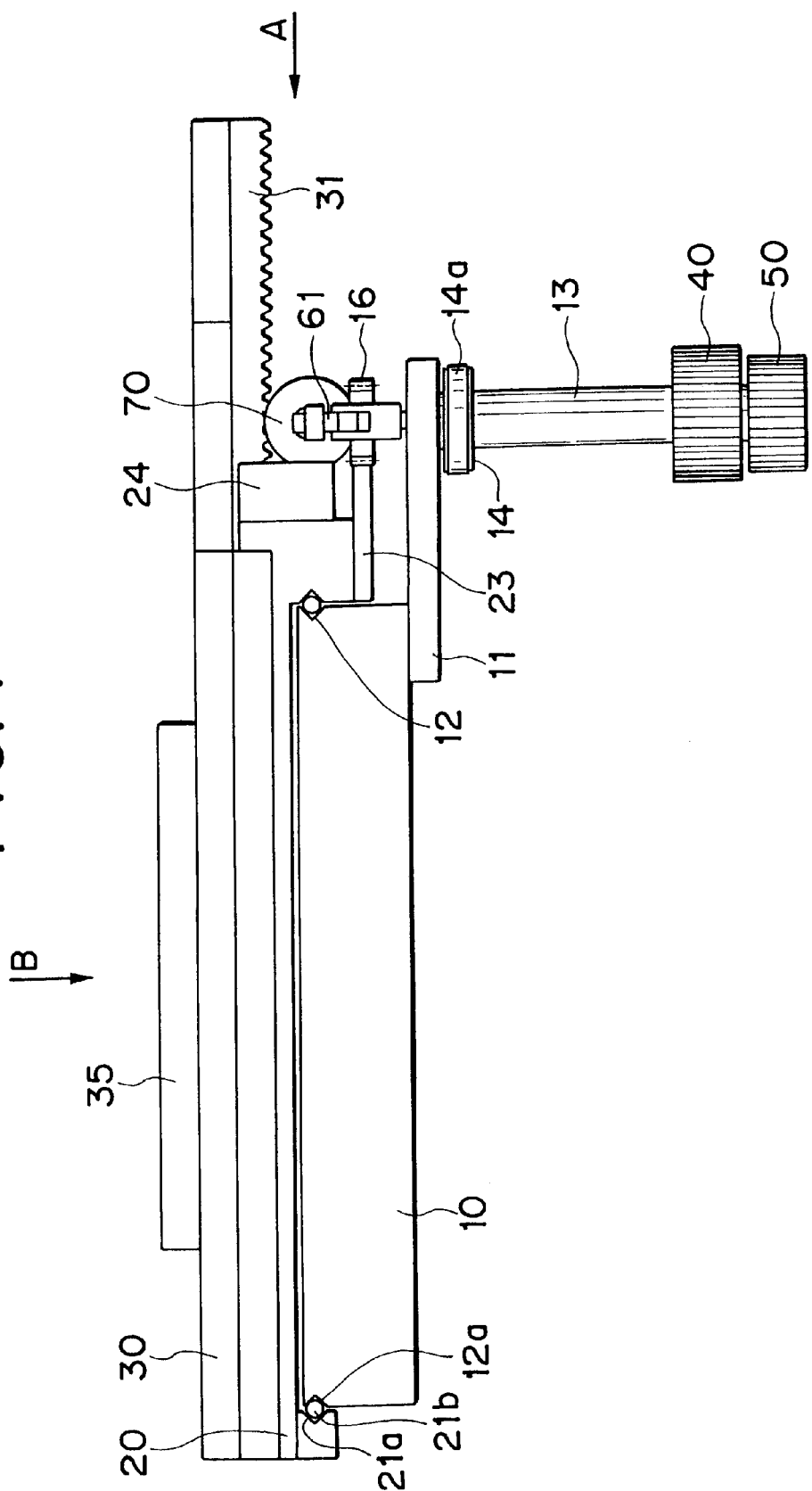
FIG. 1 is a view schematically illustrating the structure of a stage apparatus according to a first embodiment of the present invention.
Figure 2:
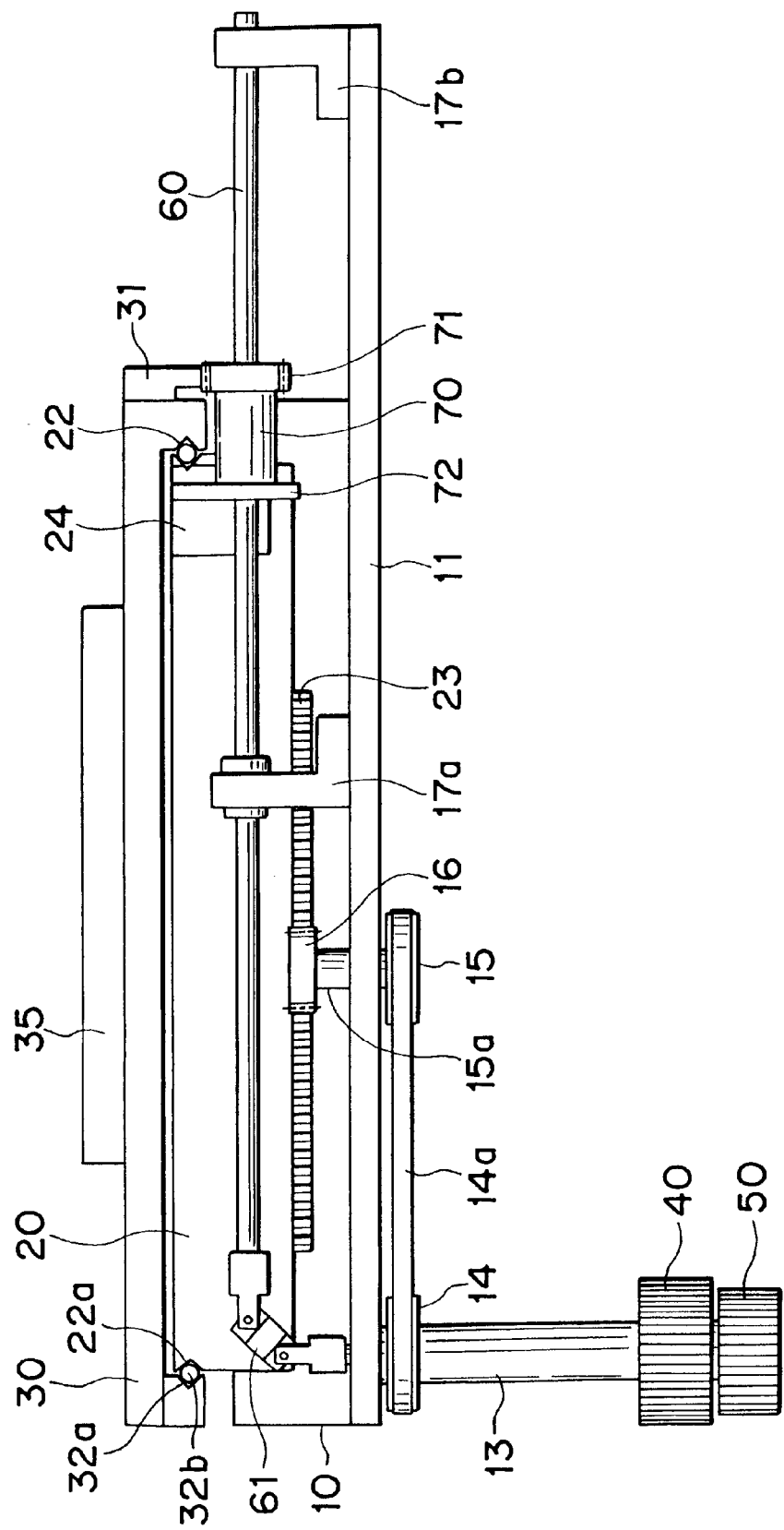
FIG. 2 is a view as viewed along the arrow A of FIG. 1.
Figure 3:
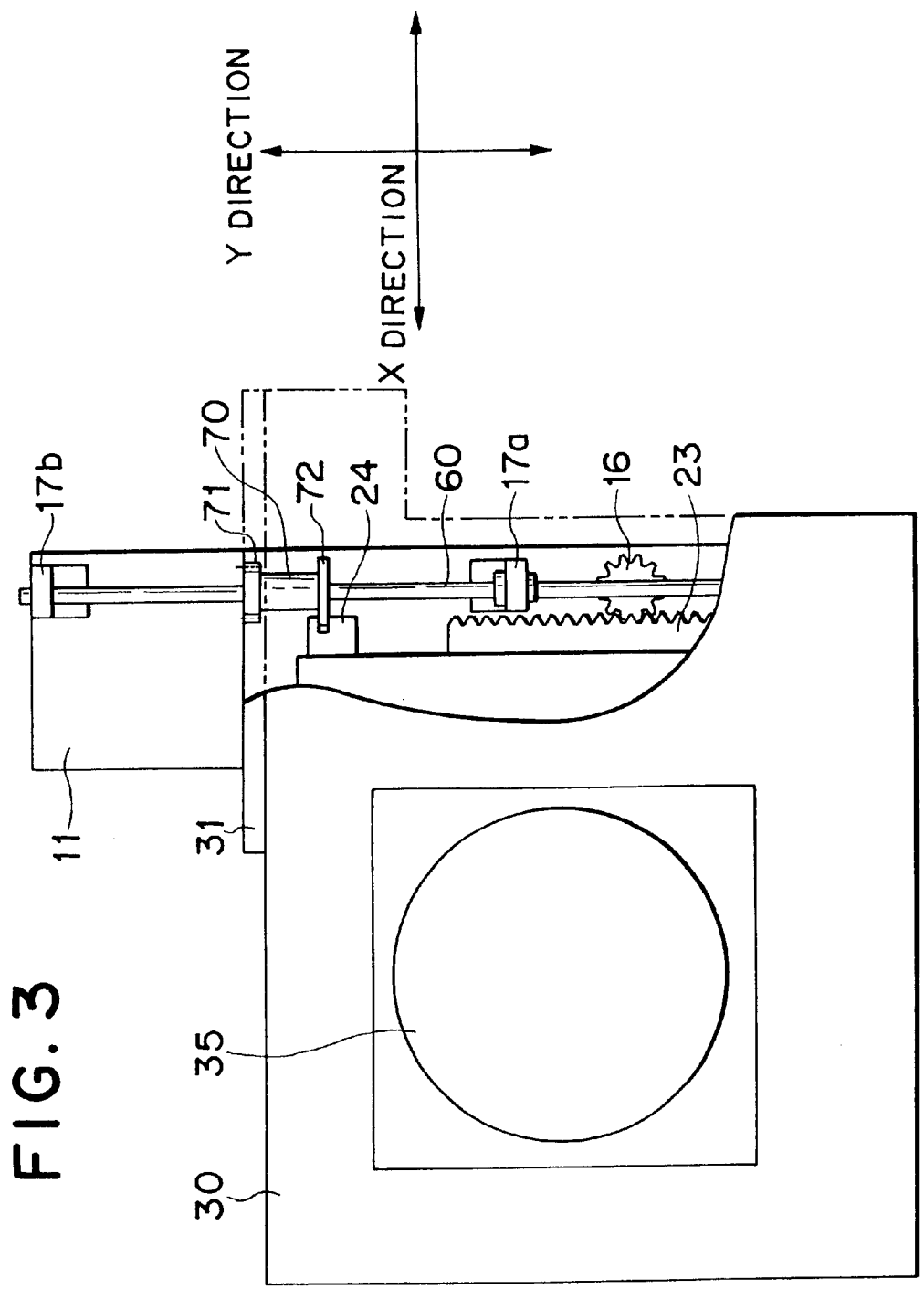
FIG. 3 is a view as viewed along the arrow B of FIG. 1.

FIG. 1 is a view schematically illustrating the structure of a stage apparatus according to a first embodiment of the present invention; FIG. 2 is a view as viewed along the arrow A of FIG. 1; FIG. 3 is a view as viewed along the arrow B of FIG. 1.

The microscope stage includes a base plate (a base element) 10, an intermediate plate (a first moving element) 20, an upper plate (a second moving element) 30, a first rotary operation portion (a first rotary operation means) 40, a second rotary operation portion (a second rotary operation means) 50, a rotary shaft 40, and a transmitting element (a transmitting means) 70.

A guide portion 12 that guides the intermediate plate 20 in the Y direction (the direction perpendicular to the plane of FIG. 1) is disposed on the base plate 10 fixed on the main body of a microscope. This guide portion 12 is constituted of grooves 12a formed on the base plate 10, grooves 21a formed on the intermediate plate 20, and balls 21b.

Further, a guide portion 22 that guides the upper plate 30 in the X direction (the direction perpendicular to the plane of FIG. 2) is disposed on the intermediate plate 20. This guide portion 22 is constituted of grooves 22a formed on the intermediate plate 20, grooves 32a formed on the upper plate 30, and balls 32b.

A base support plate 11 is integrally fixed to the base plate 10.

The first rotary operation portion 40 for moving the intermediate plate 20 in the Y direction and the second rotary operation portion 50 for moving the upper plate 30 in the X direction are disposed at one end of an operation shaft 13.

It is to be noted that although the second rotary operation portion 50 is disposed on the same operation shaft 13 as the first rotary operation portion 40, both of the rotary operation portions 40 and 50 can be rotated independently of each other.

When the rotary operation portions 40 is rotated, a pulley 14 rotates. This pulley 14 is coupled to a pulley 15 disposed at a predetermined distance in the Y direction via a belt 14a. The pulley 15 is fitted to one end of a shaft 15a rotatably fitted to the base support plate 11.

A pinion 16 that engages with a rack 23 is disposed on the other end of the shaft 15a. The rack 23 is disposed on the intermediate plate 20 so as to extend along the Y direction. The rack 23 and the pinion 16 constitute a first drive means.

On the other hand, when the rotary operation portion 50 is rotated, the rotation passes through the base support plate 11 and is transmitted to a rotary shaft 60 extending along the Y direction via a universal joint 61. The rotary shaft 60 is rotatably supported by bearings 17a and 17b disposed on the base support plate 11.

A cylindrical transmitting element 70 is disposed to the rotary shaft 60. This transmitting element 70 can move in the direction of the axis of the rotary shaft 60 (in the Y direction) and rotates integrally with the rotary shaft 60.

A pinion 71 is formed at one end of the transmitting element 70, and a flange portion 72 is formed at the other end.

The pinion 71 engages with a rack 31 fixed on the upper plate 30. This rack 31 is disposed so as to extend along the X direction. The rack 31 and the pinion 71 constitute a second drive means.

The flange portion 72 is rotatably supported by a block 24 fixed on the intermediate plate 20 and can move the transmitting element 70 in the Y direction following the movement of the intermediate plate 20.

A specimen holder 35 is mounted on the upper plate 30 by, for example, a clamp screw (not shown). Accordingly, only by loosening the clamp screw, the holder 35 can be replaced with another specimen holder depending on the specimen to be observed.

Figure 4:
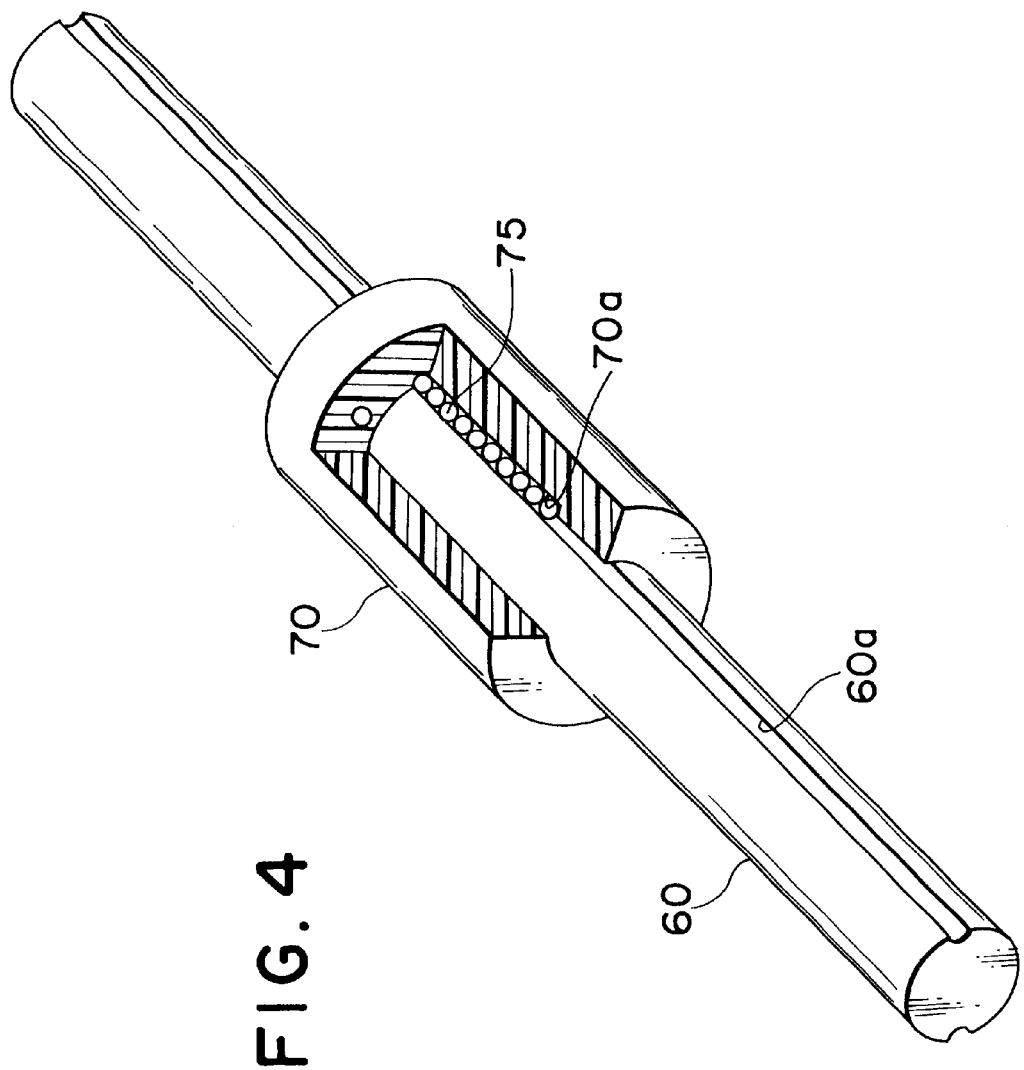
FIG. 4 is a perspective view illustrating a ball spline mechanism constituted of a rotary shaft and a transmitting element.

FIG. 4 is a perspective view illustrating a ball spline mechanism constituted of a rotary shaft and a transmitting element with the transmitting element partially broken away.

Grooves 60a and 70a are formed on the outside surface of the rotary shaft 60 and the inside surface of the transmitting element 70, respectively. Steel balls 75 circulate along the groove 70a while rolling. The transmitting element 70 can rotate integrally with the rotary shaft 60 and can linearly move along the rotary shaft 60.

The above-described stage apparatus operates in the following manner.

When the first rotary operation portion 40 is rotated, the rotational force is transmitted to the intermediate plate 20 via the pulley 14, the belt 14a, the pulley 15, the shaft: 15a, the pinion 16, and the rack 23. Therefore, the intermediate plate 20 moves in the Y direction.

When the second rotary operation portion 50 is rotated, the rotational force is transmitted to the upper plate 30 via the universal joint 61, the rotary shaft 60, the transmitting element 70, the pinion 71, and the rack 31. Therefore, the upper plate 30 moves in the direction.

On this occasion, the pinion 71 and the rack 31 always engage with each other because the transmitting element 70 can move in the Y direction integrally with the intermediate plate 20 and the upper plate 30. The transmitting element 70 is movable in the Y direction reciprocally together with the intermediate plate 20 and the upper plate 30 in a range limited by the bearings 17a and 17b fixed on the base support plate 11.

The first embodiment exhibits the following effects.

① Because the operation shaft 13 is disposed on the base plate, the first rotary operation portion 40 and the second rotary operation portion 50 do not move even when the intermediate plate 20 and the upper plate 30 are moved. Therefore, the microscope stage is easy to handle, and the stage movement operation can be easily done while observing a specimen (observing through an eyepiece lens). Therefore, the observer's fatigue can be reduced.

② Because the stage is simple in structure, compared with the conventional microscope stage (applied for a patent by Zeiss), and the stage does not require much space, is downsized, and is manufactured with a high degree of precision at low costs.

③ Because the rotational force of the rotary operation portion 40 is transmitted to the shaft 15a via the belt 14a; thus, the operation shaft 13 can be positioned toward an observer's side; and further, the rack does not protrude toward the observer's side, the rotary operation portion 40 and 50 are easy to operate, even when the stage is large-sized to meet the observation of a wafer, a reticle, a liquid crystal substrate, etc.

It is to be noted that although the universal joint 61 is used to couple the operation shaft 13 to the rotary shaft 60 in the above embodiment, such as a bevel gear, a worm gear, a belt, or a wire may be used instead of the universal joint 61.

Figure 5:
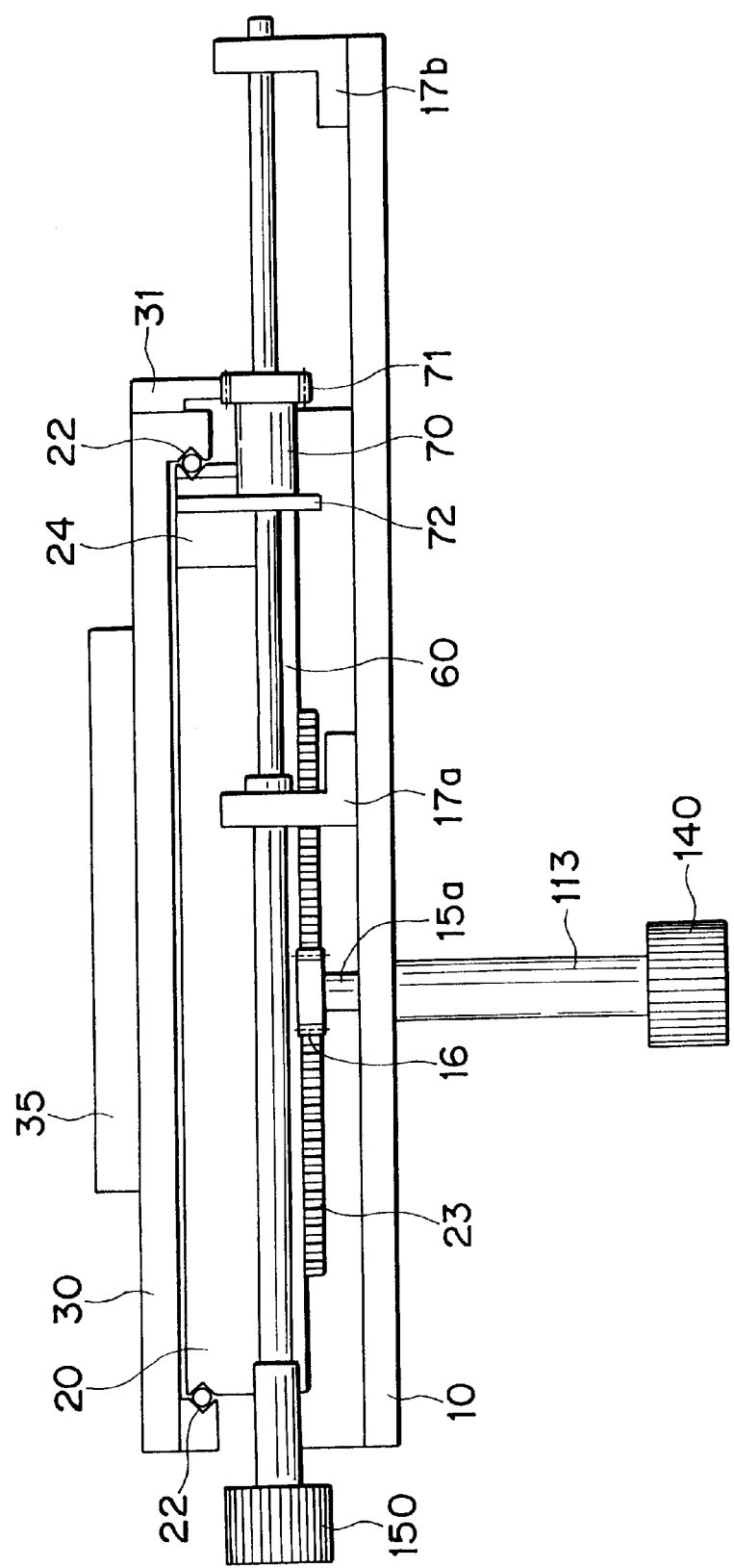
FIG. 5 is a view schematically illustrating the structure of a microscope stage apparatus to which a stage apparatus according to a second embodiment of the present invention is applied.

FIG. 5 is a view schematically illustrating the structure of a microscope stage apparatus to which a stage apparatus according to a second embodiment of the present invention is applied, and, in this Figure, the same portions as those of the first embodiment are designated by the same reference numerals and explanations of the same portions are omitted.

An operation shaft 113 of a first rotary operation portion 140 for moving a intermediate plate 20 is formed integrally with a shaft 15*a*.

By rotating the first rotary operation portion 140, the rotational force is transmitted to the intermediate plate 20 via the operation shaft 113, a pinion 16, and a rack 23, and the intermediate plate 20 moves in the Y direction.

A second rotary operation portion 150 for moving an upper plate 30 is disposed at one end of a rotary shaft 60 extending along the Y direction, By rotating the second rotary operation portion 150, the rotational force is transmitted to an upper plate 30 via the rotary shaft 60, a pinion 71, and a rack 31, and the upper plate 30 moves in the X direction.

The second embodiment exhibits the same effects as the effects ① and ② of the first embodiment; furthermore, because the number of components can be reduced by the corresponding number of components required for incorporating the universal joint 61 to change the axis direction as in the first embodiment, the stage can be simplified in structure and manufactured with a high degree of precision at low costs.

Further, in each of the above-described embodiments, it is preferable that, so that the transmitting element 70 can properly follow the intermediate plate 20 and the upper plate 30 and so that the rotation of the flange 72 is not affected, the block 24 be made of a material with a small friction coefficient or that lubrication oil be applied to the transmitting element's slide surface against the flange 72.

Further, in each of the above-described embodiments, while the rotary shaft 60 and the transmitting element 70 are implemented utilizing the ball spline mechanism, any mechanism that allows the transmitting element to rotate integrally with the rotary shaft 60 and to linearly move along the rotary shaft 60 suffices, so that it may be, for example, so configured that, without using steel balls, protrusions that engage with the grooves of the rotary shaft 60 are formed on the inside surface of the transmitting element 70.

Further, while each of the above-described embodiments has been describe as being applied to a microscope stage, the stage apparatus can also be applied to, for example, a measuring device.

As described above, the stage apparatus of the present invention is easy to handle and is downsized compared with the conventional microscope stage.

The stage apparatus of the preferred embodiments of the present invention is simple in structure and can be manufactured with a high degree of precision at low costs.

What is claimed is:

1. A stage apparatus, comprising: a base element to be fixed to a main body of a microscope;

a first moving element movable in a first direction relative to the base element;

a second moving element movable in a second direction perpendicular to the first direction relative to the first moving element;

a first rotary operation means disposed on said base element for moving said first moving element;

a second rotary operation means disposed on said base element for moving said second moving element;

a first drive means disposed between said first operation means and said first moving element for transmitting rotational force of said first operation means to said first moving element;

a rotary shaft that is disposed on said base element, extends along said first direction, and rotates in response to rotary operation of said second rotary operation means;

a transmitting means that is disposed coaxially with said rotary shaft, is movable in direction of the axis of said rotary shaft, and is rotatable integrally with said rotary shaft; and a second drive means disposed between said transmitting means and said second moving element for transmitting rotational force of said second operation means to said second moving element.

2. A stage apparatus as claimed in claim 1, wherein said second rotary operation means and said first rotary operation means are disposed on said rotary shaft extending along said first direction and on an operation shaft perpendicular to said rotary shaft, respectively.

3. A stage apparatus as claimed in claim 1, wherein said rotary shaft and said transmitting means compose a ball spline mechanism.

4. A stage apparatus as claimed in claim 3, wherein said rotary shaft is rotatably fixed to said base element through two bearings, and said transmitting means is provided on said rotary shaft movably only within a predetermined range defined by said two bearings of said rotary shaft.

5. A stage apparatus as claimed in claim 1, wherein said first rotary operation means and said second rotary operation means are disposed at an end of said base plate and juxtaposed to be coaxially rotatable.

6. A stage apparatus as claimed in claim 1, wherein said transmitting means is reciprocally movable in a predetermined range by a restricting means.

* * * * *